United States Patent Office 3,459,447
Patented Aug. 5, 1969

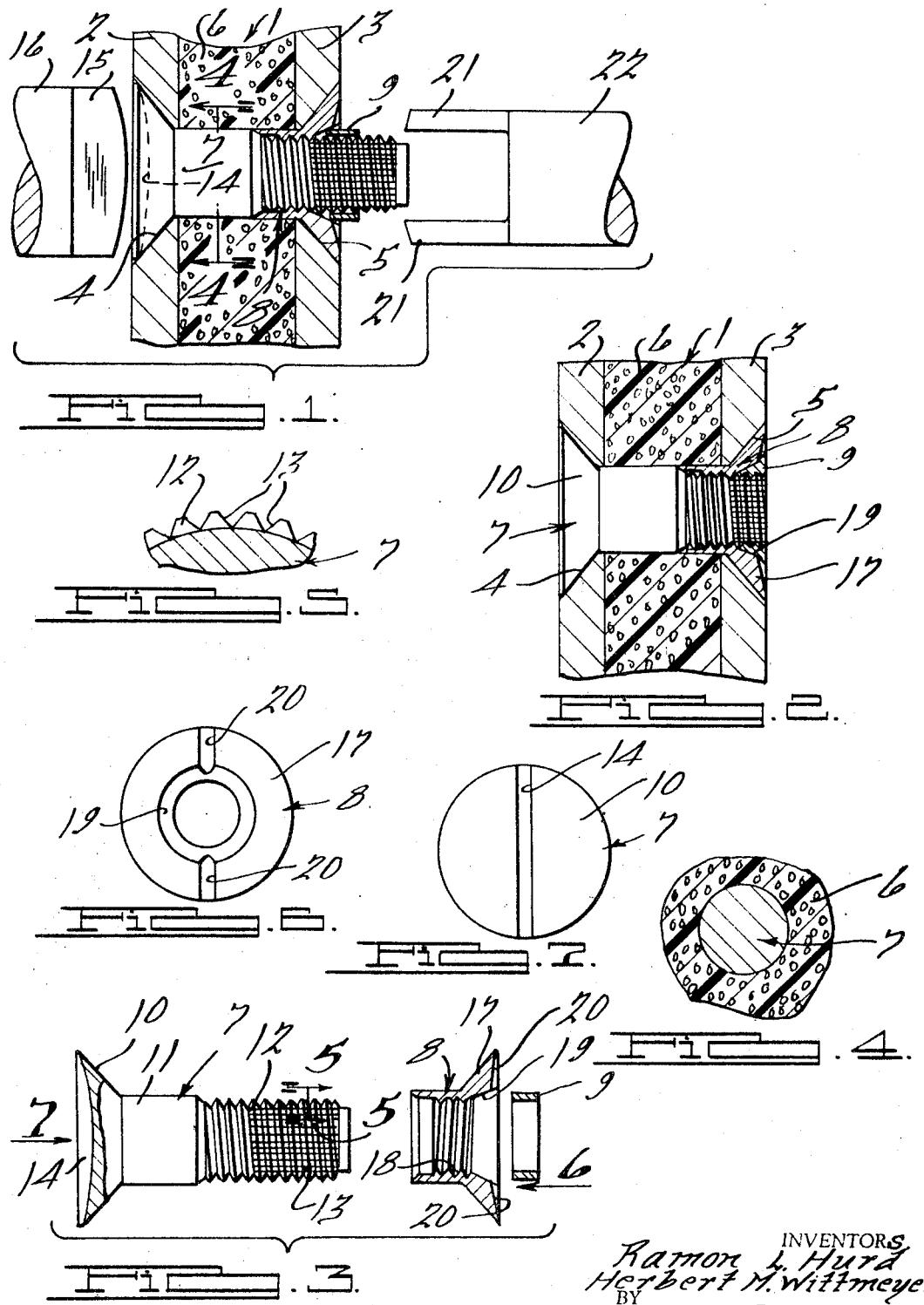

3,459,447
FLUSH FASTENER FOR PANEL ASSEMBLY
INCLUDING SOFT CORE MATERIAL
Ramon L. Hurd, Royal Oak, and Herbert M. Wittmeyer, Detroit, Mich., assignors to Huck Manufacturing Company, Detroit, Mich., a corporation of Michigan
Filed Dec. 13, 1966, Ser. No. 601,377
Int. Cl. F16b 19/00, 2/04
U.S. Cl. 287—189.36     4 Claims

ABSTRACT OF THE DISCLOSURE

A fastener assembly for a soft core material including a pin and a filler sleeve threaded together and locked together with a swaged annular collar.

---

The present invention relates to a fastener assembly in which a pair of rigid panel members which have a soft core material sandwiched therebetween are secured together in a fixed relation to each other without crushing the core material.

The object of this invention is to provide such a fastener assembly, particularly for use in the aerospace industry, in which the heads of the rivet assembly are flush with the panel surfaces on both sides and in which such flush condition exists within a practical variation in grip ranges.

Other objects of the invention will become apparent from the following specification, the drawings relating thereto and from the claims hereinafter set forth.

In the drawings, in which like numerals are used to designate like parts in the several views throughout, FIGURE 1 represents the flush fastener assembly in cross-section when parts in elevation and in intermediate stage of appplication;

FIG. 2 is a view similar to FIG. 1 of the fastener assembly of FIG. 1 after the parts have been fully assembled;

FIG. 3 is an exploded view of the fastener parts showing a portion of such parts in elevation and other portions in cross-section;

FIG. 4 is a cross-sectional view taken substantially along the line 4—4 of FIG. 1;

FIG. 5 is an enlarged partial cross-sectional view taken substantially along the line 5—5 of FIG 3;

FIG. 6 is an end elevational view taken in the direction of the arrow 6 of FIG. 3; and FIG. 7 is an end elevational view taken in the direction of the arrow 7 of FIG. 3.

Referring to the drawings, a structure to be secured together is generally indicated at 1 and comprises metal panel members 2 and 3 having aligned countersunk holes 4 and 5, respectively, provided therethrough.

Such panel members 2 and 3 are parts of an aircraft, for example, and such openings are provided in patterns according to well known aircraft design. The panels 2 and 3 have sandwiched therebetween a soft core material 6, such as honeycomb.

In securing the panel members 2 and 3 together difficulty arises because of the relatively soft core material which requires a fastener which rigidly secures the panel members together, having the necessary tensile strength, and may be applied without crushing the relatively soft core material.

The fastener assembly includes three elements, a pin generally indicated at 7, a filler sleeve generally indicated at 8 and a lock collar indicated at 9. The pin 7 is preferably formed of a suitable metal and includes a countersunk head portion 10, a body portion 11 and a threaded end portion 12. The outermost end of the thread portion is longitudinally knurled as indicated at 13, such knurling being provided by longitudinally extending V-shaped grooves formed through the outer threads. The function of such knurled grooves is to prevent rotation between the pin 7 and the filler sleeve after the parts have been assembled, as will be more fully understood hereinafter.

The head end of the pin is provided with a transverse slot 14 for the reception of the end 15 of an installation tool 16, the end 15 being formed in a shape complementary to the transverse slot 14 so as to hold the pin 7 against rotation during the fastener assembly.

The filler sleeve 8 has a countersunk head 17, complementary to the countersunk opening 5 and adapted to be received therein. The sleeve 8 is hollow therethrough having a portion threaded as indicated at 18 and terminating at its head end with an internal conical surface 19. The face of the head 17 is provided with aligned transverse slots 20 for the reception of complementary ends 21 of an installation tool 22.

The parts are assembled by inserting the pin 7 through the aligned openings 4 and 5 and through an aligned opening in the core material 6. The pin 7 is of such length that it projects slightly beyond the panel 3 but with a portion of the knurled threads 13 remaining within the panel member 3.

The filler sleeve 8 is threaded onto the threaded end of the pin 7 so that the head of the sleeve is flush with the panel 3. Since the threads 12 extending longitudinally of the pin, a fastener is provided which will accommodate different grips, in other words, panel assemblies of different widths.

During the assembly of the sleeve onto the pin, the pin is held against rotation by engagement of the screwdriver-like tool 16 within the slot 14 while the collar is rotated by the double screwdriver-like tool 22. The ends 21 project beyond the body of the tool 22 so that the projecting end of the pin 7 may be received therein.

So that after assembly, the parts 7 and 8 are fixed against rotation, the lock collar 9, which is formed of a swageable metal material, is disposed in embracing relationship to the projecting end of the pin 7 and is forced into the groove formed by the conical surface 19 on the sleeve 8 and the adjacent knurled threads. Since the collar 9 is of a swageable material it will follow the contour of the conical surface and be forced into the adjacent knurled threads thus locking the parts 7 and 8 against rotation and providing a rigid fastener which will retain its fixed length.

That portion of the pin which remains projecting beyond the surface of panel 3 is cut off so that the pin is flush with the outer surface of the filler sleeve 8 and flush with the panel 3.

While it will be apparent that the preferred embodiment of the invention disclosed is well calculated to fullfill the objects above stated, it will be appreciated that the invention is susceptible to modification, variation and change without departing from the proper scope or fair meaning of the disclosure.

What is claimed is:

1. A flush fastener assembly comprising a pair of spaced panel members having a soft core material interposed therebetween in which said panel members are connected together by a rigid fastener assembly extending through aligned countersunk openings in said panel members and through said core material, said rigid fastener assembly comprising a pin having a countersunk head seating in one of said panel openings and a shank portion extending through said core material and terminating in a threaded portion, the outermost portion of said threaded portion being knurled, a hollow filler sleeve having a countersunk head adapted to seat in the opposite aligned opening of said panel openings, the innermost end of said filler sleeve projecting into said core material and being internally threaded and threaded to the end of said shank portion, the outer end of said sleeve being formed with an internal conical seat in alignment with said knurled portion, and an annular collar seated within said conical seat and swaged into the knurled end of said threaded portion, said filler sleeve including lock receiving means associated with said conical seat for receiving a portion of said annular collar when it is swaged into said knurled end whereby said filler sleeve and said pin are mechanically locked together from relative rotation in either direction by said collar, said lock receiving means including a slot extending radially across said head of said filler sleeve and communicating with said conical seat with said slot adapted to receive a tool for setting said fastener assembly.

2. A fastened joint assembly comprising a pair of spaced panel members having a soft core material interposed therebetween in which said panel members are connected together by a rigid fastener assembly extending through aligned openings in said panel members and through said core material, said rigid fastener assembly comprising a pin having a head engaging one of said panels and a shank portion extending through said core material and terminating in a threaded portion, said shank portion having a smooth portion adjacent said pin head with said threaded portion being of a smaller diameter than said smooth portion, the outermost portion of said threaded portion having discontinuities therein, a hollow filler sleeve having a head adapted to engage the opposite one of said panels, the innermost end of said filler sleeve projecting into said core material and terminating proximate the inner extremity of said smooth portion of said pin and being internally threaded and threaded to the end of said shank portion, said end of said sleeve being of a selected diameter substantially equal to the diameter of said smooth portion with the opening through said soft core being of a diameter substantially equal to said selected diameter, the outer end of said sleeve being formed with an internal conical seat in alignment with said discontinuities, and an annular collar seated within said conical seat and swaged into said discontinuities of said threaded portion, said filler sleeve including lock receiving means associated with said conical seat for receiving a portion of said annular collar when it is swaged into said discontinuities whereby said filler sleeve and said pin are mechanically locked together from relative rotation in either direction by said collar, said lock receiving means including a slot extending radially across said head of said filler sleeve and communicating with said conical seat with said slot adapted to receive a tool for setting said fastener assembly.

3. A flush fastener assembly for securing together a plurality of workpieces having aligned openings with the openings at the opposite surfaces of the workpieces being countersunk, said fastener assembly comprising: a pin having a countersunk head adapted to seat in one of the countersunk openings and a shank portion extending from said countersunk head and adapted to extend through the aligned openings, said shank portion terminating in a threaded portion with the outermost portion of said threaded portion having discontinuities in the thread to define a lock, a hollow filler sleeve having a countersunk head adapted to seat in the opposite countersunk opening, the innermost end of said filler sleeve being internally threaded for threaded engagement on the end of said shank portion, the outer end of said sleeve being formed with an internal conical seat adapted to be in alignment with said discontinuities, and an annular collar of a deformable material adapted to be seated within said conical seat and to be swaged into the end of said shank portion including said discontinuities, said filler sleeve including lock receiving means associated with said conical seat for receiving a portion of said annular collar when it is swaged into the end of said shank portion whereby said filler sleeve and said pin are mechanically locked together from relative rotation in either direction by said collar, said lock receiving means including a slot extending radially across said head of said filler sleeve and communicating with said conical seat with said slot adapted to receive a tool for setting said fastener assembly.

4. A flush fastener assembly for securing together a plurality of workpieces having aligned openings with the openings at the opposite surfaces of the workpieces being countersunk, said fastener assembly comprising: a pin having a countersunk head adapted to seat in one of the countersunk openings and a shank portion extending from said countersunk head and adapted to extend through the aligned openings, said shank portion terminating in a threaded portion with the outermost portion of said threaded portion having discontinuities in the thread to define a lock, a hollow filler sleeve having a countersunk head adapted to seat in the opposite countersunk opening, the innermost end of said filler sleeve being internally threaded for threaded engagement on the end of said shank portion, the outer end of said sleeve being formed with an internal conical seat adapted to be in alignment with said discontinuities, and an annular collar of a deformable material adapted to be seated within said conical seat and to be swaged into the end of said shank portion including said discontinuities, said filler sleeve including lock receiving means comprising a slot in the face of said head in communication with said conical seat for receiving a portion of said annular collar when it is swaged into the end of said shank portion whereby said filler sleeve and said pin are mechanically locked together from relative rotation in either direction by said collar.

References Cited

UNITED STATES PATENTS

| 771,935 | 10/1904 | Reynolds | 151—14.5 |
|---|---|---|---|
| 2,511,051 | 6/1950 | Dzus | 85—4 |
| 906,475 | 12/1908 | Ullmann | 151—29 |
| 1,467,824 | 9/1923 | Ahlers | 85—4 |
| 1,508,316 | 9/1924 | Brune | 151—28 |
| 1,835,524 | 12/1931 | Rinehart et al. | 85—4 |
| 2,001,645 | 5/1935 | Abell | 151—30 |

FOREIGN PATENTS 156,918  1/1921  Great Britain.

EDWARD C. ALLEN, Primary Examiner

U.S. Cl. X.R.

85—4; 151—2, 30